(12) United States Patent
Girshov et al.

(10) Patent No.: US 7,037,466 B2
(45) Date of Patent: May 2, 2006

(54) METHOD AND APPARATUS FOR FORMING BILLETS FROM METALLIC CHIP SCRAPS

(76) Inventors: Vladimir Leonidovich Girshov, ul. Orbely, 29, 15, St. Petersburg (RU) 194223; Arnold Nikolayevich Treschevskiy, ul. Narodnogo Opolchenija, 159, 67, St. Petersburg (RU) 198260; Victor Georgievich Kochkin, Dachny pr. 14-1, 13, St. Petersburg (RU) 198225; Alexey Alexandrovich Abramov, ul. Rudneva, 11, 203, St. Petersburg (RU) 194292; Natalja Semenovna Sidenko, pr. M. Jukova, 56-2, 164, St. Petersburg (RU) 198261

( * ) Notice: Subject to any disclaimer, the term of this patent is extended or adjusted under 35 U.S.C. 154(b) by 145 days.

(21) Appl. No.: 10/672,588

(22) Filed: Sep. 29, 2003

(65) Prior Publication Data
US 2004/0067155 A1    Apr. 8, 2004

Related U.S. Application Data

(60) Provisional application No. 60/415,800, filed on Oct. 4, 2002.

(51) Int. Cl.
*B22F 1/00*        (2006.01)
*B22F 3/14*        (2006.01)
(52) U.S. Cl. .............................. 419/48; 419/25; 419/53
(58) Field of Classification Search .................. 75/746; 419/33, 54, 55, 48, 53, 25; 425/78
See application file for complete search history.

(56) References Cited

U.S. PATENT DOCUMENTS

| | | | | |
|---|---|---|---|---|
| 4,018,633 A | * | 4/1977 | Holland | 419/33 |
| 4,173,061 A | * | 11/1979 | Shimizu et al. | 29/403.2 |
| 4,832,760 A | | 5/1989 | Eylon et al. | |
| 5,340,472 A | * | 8/1994 | Heck | 210/173 |
| 5,476,631 A | * | 12/1995 | Brown et al. | 419/38 |
| 5,542,348 A | * | 8/1996 | Bendzick | 100/37 |
| 5,919,283 A | * | 7/1999 | Areaux | 75/571 |
| 2004/0099396 A1 | * | 5/2004 | Girshov et al. | 164/47 |

FOREIGN PATENT DOCUMENTS

| | | |
|---|---|---|
| RU | 2040367 | 7/1995 |
| RU | 2048268 | 11/1995 |
| RU | 2081727 | 6/1997 |

(Continued)

OTHER PUBLICATIONS

N.F. Anoshkin, journal Tsvetniye Metally, No. 5, 1999, Atlanta, U.S., Dec. 7-9, 1998.

(Continued)

*Primary Examiner*—Daniel Jenkins
(74) *Attorney, Agent, or Firm*—Richard A. Morgan; Paul A. Gottlieb

(57) ABSTRACT

After recycled titanium alloy chips are crushed and cleaned, they are pressed into cylindrically briquettes with a relative density of 0.6, and placed into capsules. The capsules are heated and placed into a preheated pressing rig. The pressing rig repetitively applies axial force to the capsule, resulting in a relative density of at least 0.95. The product billets are used for consumable electrodes, secondary casting alloys, forgings, extruded semi-finished products and the like.

12 Claims, 3 Drawing Sheets

FOREIGN PATENT DOCUMENTS

| RU | 2114925    |   | 7/1998 |
|----|------------|---|--------|
| RU | 2148665    |   | 5/2000 |
| RU | 2152447    |   | 7/2000 |
| RU | 2001109063 |   | 3/2001 |
| RU | 2197548    |   | 1/2003 |
| RU | 2201977    | * | 4/2003 |
| RU | 2001113682 |   | 4/2003 |

OTHER PUBLICATIONS

"State and Titanium World Market Prospects", BIKI, No. 43, Apr. 9, 1998, pp. 14-15.

A.D. Hartman et al, journal JOM, Sep. 1998, pp. 16-19.

F.H. Froes, journal JOM, Sep. 1998, pp. 41-43.

A.M. Kalinyuk et al, journal Problemy SEM, No. 1, 1991, pp. 59-63.

B.E. Paton et al, journal Problem SEM, No. 3, 1995, pp. 14-23.

E.A. Afanasyev et al, journal Konversiya v Machnostroyenyi, No. 1, 2000, pp. 77-79.

Tantal advertisement bulletin, 1991, Ufa, Russian Federation.

B.A. Kilachev et al, journal Izvestiya Vuzov, Tsvetnaya Metallurgia, No. 4, 1997, pp. 60-65.

V.V. Shevchenko et al, journal Izvestiya Vuzov, Tsvetnaya Metallurgia, No. 1, 1995, pp. 59-63.

Yu A. Filin et al, journal Liteinoye Proizvodstvo, No. 7, 2000, pp. 21-22.

M.N. Saubanov et al, journal Liteinoye Proizvodstvo, No. 11, 2000, p. 19.

A.N. Treschevsky et al, journal Liteinoye Proizvodstvo, No. 9, 1993, pp. 20-22.

U.R. M. Sigonov, journal Svetnye Mettaly, No. 5, 1995, pp. 47-50.

M.M. Johns et al, journal Bulletin of STI, No. 7, 1971, pp. 52-55.

K.B. Abramova et al, journal Tsvetnye Metally, No. 12, 1998, pp. 70-74.

V.L. Girshov et al, 9th World Conference on Titanium, Jun. 7-11, 1999, St. Petersburg, Russia.

V.L. Girshov, Materials of Science and Practice Information Consultation Seminar, Nov. 10-11, 1999, St. Petersburg, Russia, journal Politechnica, 2000, pp. 40-43.

V.L. Girshov et al, journal Metalloobrabotka, No. 2, 2001, pp. 42-44.

V.L. Girshov et al, journal Metalloobrabotka, No. 3, 2001, pp. 36-40.

Project 717 ISTC, Titanium Recycling, Final Report, pp. 3 and 6, dated Jul. 22, 2002.

* cited by examiner

METHOD AND APPARATUS FOR FORMING BILLETS FROM METALLIC CHIP SCRAPS

CROSS-REFERENCE TO RELATED APPLICATIONS

This application claims the benefit of U.S. Provisional Application No. 60/415,800 filed Oct. 4, 2002, entitled "Method and Apparatus for Forming Billets from Metallic Chip Scraps", which is incorporated herein by this reference.

STATEMENT REGARDING FEDERALLY SPONSORED RESEARCH OR DEVELOPMENT

The United Stated Government has rights in this invention.

REFERENCE TO A "SEQUENCE LISTING", A TABLE, OR A COMPUTER PROGRAM LISTING APPENDIX SUBMITTED ON A COMPACT DISC (SEE 37 CFR 1.52(E)(5))

Not Applicable

BACKGROUND OF THE INVENTION

1. Field of the Invention

The present invention relates generally to metallic chips recycling, particularly, titanium alloys metal chips, and more particularly to forming billets that can then be used for producing consumable electrodes for obtaining secondary casting alloys, in blacksmith's work for obtaining forgings, extruded semi-finished products and the like.

2. Description of Related Art

The most commonly known, (about 45% of the total amount of waste products of the titanium industry), and the most difficult to be recycled, sort of waste products in the metals industry is chip scrap. The difficulty of preparation of chip scrap for recycling consists in it's great volume, contamination with emulsion, machining oil contamination, contamination by foreign particles of other alloys, etc. At the present time, in Russia only a minor amount of chip scrap waste products is recycled, mainly in the metallurgy industry, the remaining chip scrap waste resulting in adverse environmental impacts with no accompanying economic benefits.

One current method (1. Abramova K. B. and others. Briquetting of titanium chip scrap under the influence of electric current sharp pulses, "Tsvetnye metally", 1998, No. 12, p. 70–74) for forming billets comprises cleaning of the titanium chip scrap, further briquetting by cold molding with simultaneous influence of electric current sharp pulses, which provide partial diffusion welding of individual chip scrap elements. By this method, briquettes with relative density up to 0.45 of alloy density are obtained. The disadvantage of said method is low density of chip scrap briquettes and considerable power intensity of the process.

In another current method for producing strained billets in the form of consumable electrodes from titanium alloys (2. Patent RF No. 2114925, C22B 9/20, H05B 7/06, 1998.) bulk scrap waste products, the waste products are stowed into the capsule with end plates (templates), which is charged into appropriate configuration container, and further axial force is applied to the end plates with simultaneous electric current passing through them and the layer of waste products to provide diffusion welding in bulk scrap waste products contact zone among them. This method has the following disadvantages: manufacturing the capsule of the same name with waste products titanium alloy, considerable power intensity of the process, and low density of obtained billets, which does not exceed 60% of base metal density.

A current device for pressing billets for consumable electrodes (3. Patent RF No. 2148665, C22B 9/20, H05B 7/07, 2000), preferably from chip scrap and shear cuttings, comprises a container mounted on the basis, a mould placed in it, principal press-washer fixed on a compression ram and an autonomous press-washer. This device is deficient in that, under conditions of hot deformation of titanium chip scrap briquettes, which are placed into shielded arc (cyn. gas protection) capsule, its covering corrugates because of friction between the surfaces of the mould and capsule.

BRIEF SUMMARY OF THE INVENTION

It is an object of the present invention to improve the utilization of titanium chip scrap waste products in formed billets having increased relative density and reduced power intensity of the process.

It is a further object of the present invention to prevent corrugation of the capsule covering (cowling) during hot deformation.

In the present invention, after the chips are crushed and cleaned, the chips are pressed into cylindrically shaped briquettes with relative density of at least 0.6, and placed into a capsule having a butt-end cover at each end. The capsule is heated to a temperature in the range of 900–1080 deg C., preferably in the range of 900–1050 deg C., and placed into a pressing rig apparatus. The pressing rig repetitively applies axial deformation force to each end of the capsule, resulting in a billet having relative density of at least 0.95. In a preferred embodiment, the pressing rig is pre-heated to a temperature of at least 0.2 of the heated capsule temperature to avoid excessive cooling of the capsule during the hot deformation operation. In a preferred embodiment, the deformation force is uniformly applied over the surfaces of the butt-ends of the capsule.

The pressing rig apparatus of the present invention comprises a basis, a container, a mould, a compression ram, a principal press-washer fixed to the ram and an autonomous press-washer. In a preferred embodiment, the diameter of one or both of the press-washers are less than the capsule diameter (or mould interior diameter) by two thicknesses of the capsule cowling, and wherein the press-washers form one or more chambers with the mould to receive the shed cowling during the hot deformation process.

DETAILED DESCRIPTION OF THE INVENTION

Definitions

Figure 1:
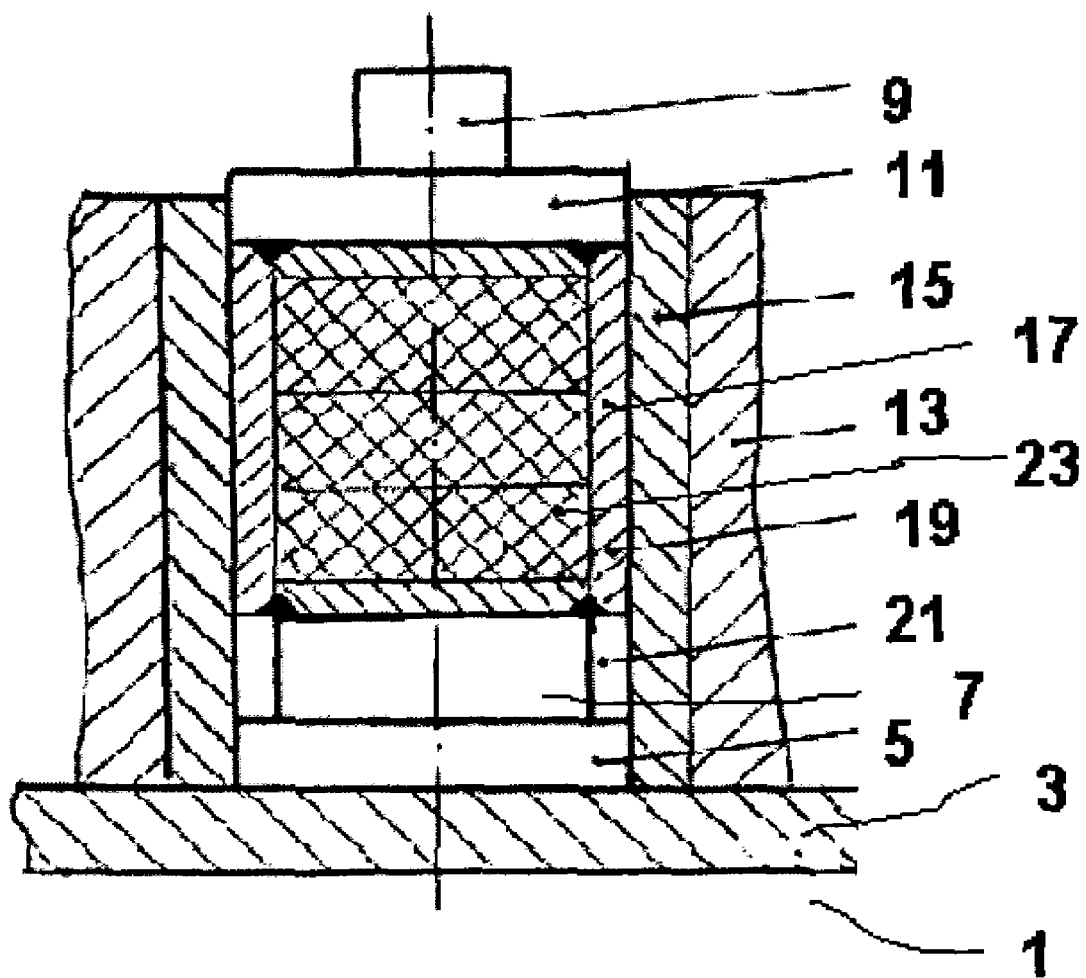
FIG. 1 shows a sectional view of an embodiment of the pressing rig apparatus of the present invention having a single chamber (for lower plunger) for receiving cowling material shed during hot deformation.

| | |
|---|---|
| $H_1$ | capsule axial dimension before hot deformation |
| $H_2$ | capsule axial dimension after hot deformation |
| deformation degree (%) | change in capsule height $[(H_1 - H_2)/H_1] \times 100$ |
| depression degree | $H_1 - H_2$ |
| relative density | ratio of metal volume to total (metal plus pores) volume |
| work space | working space in mould for press-washers considering change in capsule dimensions during hot deformation and, in certain embodiments, receiving shed cowling material during hot deformation |
| work space height | $N \times (H_1 - H_2)$, where N can range from 1.2 to 1.5 |

The method of the present invention comprises crushing chip scrap into particles, cleaning the particles, and pressing ("cold molding") the particles to form cylindrical shape briquettes. The briquettes are placed into a capsule sealed at each end with butt-end covers. The capsule is heated, placed into a pressing rig apparatus, subjected to hot deformation loading in the axial direction, and finally cooled.

Chip scrap crushing and cleaning may be performed as follows. The chip scrap, preferably titanium alloys, is crushed (by means well known in the art) to obtain chip scrap particles preferably of 5–20 mm particle size. The particles are washed in degreasing solution, (for example, comprising 30–35 g/l of soda ash and 15–20 g/l of trisodium phosphate at the temperature of 60–80 deg C.); washed in water; and then dried at the temperature of 200 deg C. The dry chip scrap particles are then preferably subjected to magnetic separation (by means well known in the art).

In a preferred embodiment, the cleaned particles are subjected to vacuum-thermal degassing (VTD) comprising: holding the particles at a temperature in the range of 550–650 deg C. for 1–2 hours at a pressure of $5 \times 10^{-3}$ mm Hg; cooling the particles to 200 deg C. while still under vacuum, followed by a final cooldown to ambient temperature at atmospheric pressure. During VTD dirt is removed from the surface of chip scrap, deformation cold-hardening formed during machining of the alloy and chip scrap crushing is removed, as a result of it chip scrap pressing effort is reduced by 20–30% (at prescribed briquette density). The temperature of degassing from 550 deg C. to 650 deg C. under holding for 1–2 hours provides greatest effect of gas dirt removing and chip scrap surface microhardness (cold-hardening) lowering, rise in VTD temperature over 650 deg C. and holding for over 2 hours is not economically sound because of considerable power inputs.

The pressing (cold molding), by means well known in the art, of chip scrap particles results in briquettes having relative density of not less than 0.6. The cold molding of chip scrap briquettes up to relative density of not less than 0.6 results in diminished corrugating susceptibility of the capsule. As is known in art for powder metallurgy, mechanical or hydraulic presses may be used. For the pressing operation, steel pressing molds with surface hardness 45–50 HRC (without lubricants) may be used. For transportation of chips and pressed briquettes, stainless steel containers may be used. The cold molding is carried out at ambient temperature. The cold molding is performed under a steadily applied force, applied pressure generally being in the range of 300–400 MPa.

The capsule is heated to a temperature in the range of 900–1080 deg C., preferably in the range of 900–1050 deg C. At temperatures higher than 1080 deg C., the titanium interacts with steel, forming liquid eutectics that will cause embrittlement possibly leading to failure of the capsule. At temperatures lower than 900 deg C., the resistance to plastic deformation from the side of a capsule and a briquette considerably increases.

The hot deformation (forging) in axial direction is carried out by repetitive application of dynamic impingement force having frequency and magnitude sufficient to provide relative density of billets not less than 0.95. The deformation force is uniformly and simultaneously applied over the surfaces of each capsule butt-ends.

Hot deformation (depression) is carried out sufficient to result in capsule deformation degree of not less than 35%. Depression with deformation degree not less than 35% results in obtaining a billet with relative density of 0.95 or greater.

Deformation by repetitive application of impingement force diminishes the time the instrument contacts with the billet, improves the temperature condition of the process, and deformation up to density of not less than 0.95 gives the opportunity for further hot deformation of the billets without special protection against oxidation to obtain commodity output in the form of bars, plates, tubes and different configuration forgings.

In a preferred embodiment, the pressing rig apparatus is pre-heated to a temperature at least 0.2 of the heated capsule temperature. Heating of the pressing rig to a temperature of at least 0.2 that of the heated capsule temperature excludes excessive cooling of the surface layers of the billet.

The application of deformation force uniformly over the surface of the butt-ends of the capsule minimizes possible outflow of briquette metal through clearance between press-washer and mould, and preferably allowance is made for one or more chambers for receiving cowling material shed during the hot deformation process. The deformation of the capsule from the opposing directions of the upper and lower (bottom) butt-ends of the capsule over the limited surfaces provides cowling metal outflow in the opposite directions and diminishes the contact friction between the capsule and the mould.

Low-carbon steel may be used for manufacture of the capsule cowling and butt-end covers, which diminishes its cost and simplifies removal (by mechanical means) from the titanium base of the billet after cooling.

The pressing rig apparatus of the present invention for manufacture of billets comprises a basis, a container mounted on the basis, a mould placed in the container, an upper plunger (compression ram) with a principal press-washer fixed on it and a lower plunger with an autonomous press-washer fixed on it located on the basis. Both press-washers are located within the mould. The work space height for the press-washers is sized to allow proper consideration for the capsule deformation degree in the axial direction.

In a preferred embodiment, one or both press-washers (principal and autonomous) have diameters which are less than internal diameter of the mould by two thicknesses of the capsule cowling (and also less than the capsule butt end covers by two thickness of the capsule cowling), wherein the press-washers work space includes chambers for receiving capsule cowling that is shed during the hot deformation step.

Receipt of the shed cowling reduces formation of corrugations on the billet surface. Sizing of the work space height to be 1.2–1.5 times more than capsule depression degree eliminates probability of press-washer bending, which can lead to tool breakage.

Figure 2:
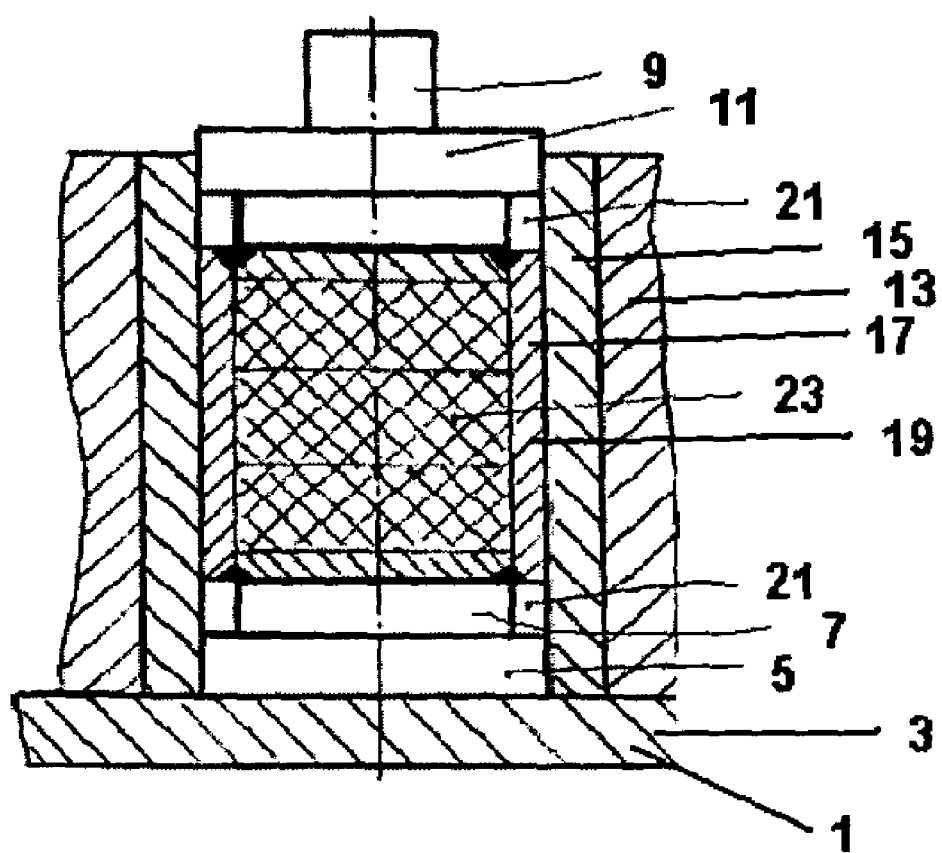
FIG. 2 shows a sectional view of an embodiment of the pressing rig apparatus of the present invention having two chambers (for upper and lower plungers) for receiving cowling material shed during hot deformation.
Figure 3:
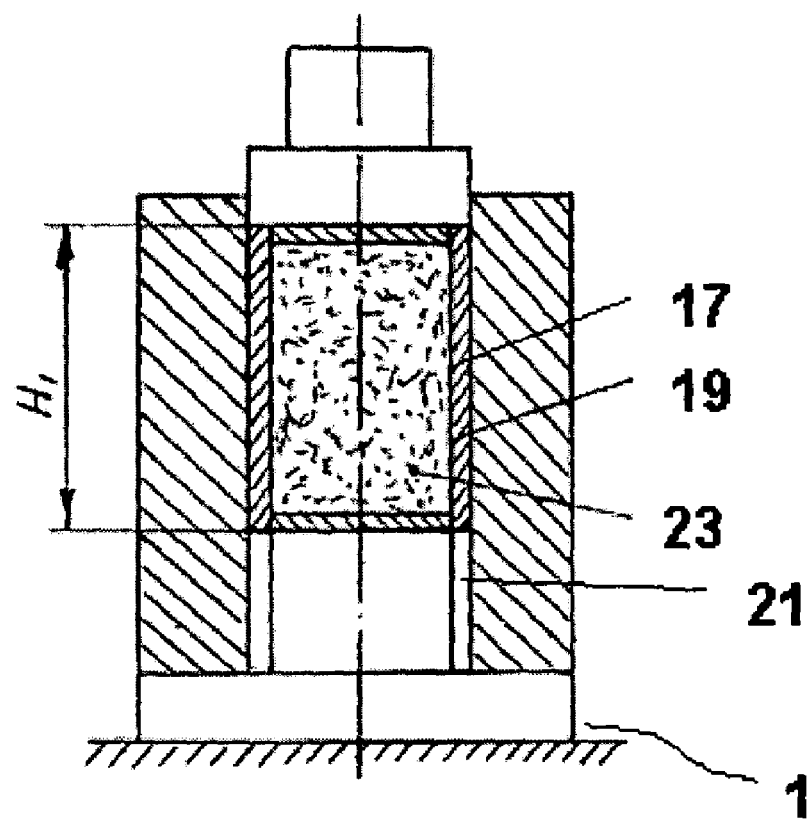
FIGS. 3 and 4 show sectional views of the pressing rig apparatus with the capsule in the undeformed (FIG. 3) and deformed (FIG. 4) states.
Figure 4:
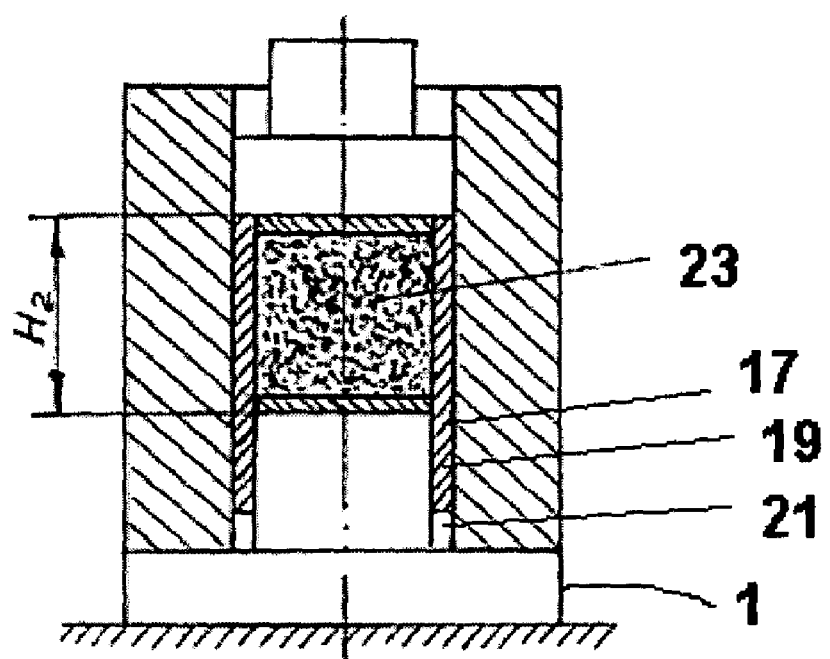

The pressing rig apparatus is shown in greater detail with the accompanying drawings, in which FIG. 1 shows the pressing rig in section view with a chamber for receiving cowling metal at the bottom, and in which FIG. 2 shows chambers at the bottom and upper parts of the mould. In FIGS. 1 and 2, the pressing rig 1 comprises a container 13 mounted on the basis 3, a mould 15, an upper plunger (compression ram) 9 with principal press-washer 11 fixed on it and a lower plunger 5 with an autonomous press-washer 7 mounted on the basis 1. In preferred embodiments, the press-washers 11 and/or 7 cooperates with the bottom and/or upper parts of the mould 3 to define chamber(s) 21 for receiving cowling material 19 from capsule 17 during hot deformation of the capsule charged with chip scrap briquettes 23 are formed. FIG. 3 shows an embodiment having a single chamber 21 (for lower plunger). FIG. 4 shows an embodiment having two chambers 21 (for upper and lower plungers).

Referring to FIGS. 3 and 4, a capsule 17, briquettes 23 and pressing rig 1 are shown, wherein the pressing rig 1 has a chamber 21 for receiving cowling material 19 from capsule 17 shed during hot deformation of the capsule 17. In FIG. 3, the capsule 17 is undeformed (capsule height of $H_1$), the briquettes 23 have relative density of at least 0.6. In FIG. 4, the capsule 17 has undergone hot deformation (capsule height of $H_2$), cowling material 19 has been extruded into chamber 21, and briquettes 23 relative density is greater than or equal to 0.95.

EXAMPLE

Metal chip scrap of titanium alloy BT5 grade was crushed into particles with particle size ranging from 5–20 mm. Contaminants and foreign particles were removed by rinsing in solution, comprised of 30–35 g/l of soda ash and 15–20 g/l of trisodium phosphate at the temperature of 60–80 deg C.; followed by rinsing in water, drying and finally subjected to magnetic separation. The particles were pressed to form cylindrical shape briquettes having a diameter of 150 mm and height of 100 mm, with relative density of 0.6. The briquettes were placed into a capsule manufactured of low-carbon sheet steel CT3 grade. Wall thickness of the capsule cowling and butt-end covers was 2.0 mm, capsule height was 300 mm (without taking thickness of covers into consideration).

After sealing-in, (by means of butt-end covers welded on), the capsule was heated in gas-furnace to the temperature of 1080 deg C. for 1.5–2 hours, and was kept at said temperature for 1 hour for temperature equalization through capsule volume. The pressing rig was preheated to the temperature of 250–270 deg C., further the capsule was placed into it, the surface temperature of the capsule before deformation was 950–980 deg C. The work space of the autonomous press-washer was 150 mm in diameter and 130 mm in height (1.24 of depression degree). The diameter of the work space of the principal (upper plunger) press-washer was 155 mm. The deformation was carried out by means of steam-air hammer with falling parts mass of 700 kg. and falling parts velocity of 5–6 m/sec. Two blows were sufficient to achieve deformation degree of 35%. The first blow was "soft" (mild blow with braking/slowing of the falling parts) followed by a "hard" (rigid blow without braking) blow.

After extraction of the billet from the mould it was slowly cooled (with furnace), then steel cowling was removed by turning on a lathe.

After the steel cowling removal there were no corrugations on the billet surface since outflow of cowling material into the chamber formed in the bottom part of the mould between its wall and the autonomous press-washer had taken place. The billet relative density amounted 0.96.

Further the billet was forged in radial direction up to 100 mm in diameter. The billet relative density after radial forging increased up to 0.97. There were four capsules manufactured in all, said capsules were jumped with different rates of deformation and number of hammer blows. The obtained chip scrap billets of titanium alloy BT5 grade after hot deformation and radial forging were subjected to mechanical test, the results of said mechanical test and conditions thereof are given in Table 1.

The analysis of the Table 1 data shows, that stress-strain properties of the strained titanium chip scrap billets are up to standard of secondary casting alloy.

TABLE 1

| Billets No. | Rate of deformation, % | Number of hammer blows | Relative density of strained billets | Tensile strength $\sigma_B$ (MPa) | Elongation $\delta$ (%) | Specific Sharpy U-Notched Impact Energy KCU, J/cm$^2$ |
| --- | --- | --- | --- | --- | --- | --- |
| 1 | 35 | 2 | 0.95/0.97* | 870/910 | 1.0/1.2 | 35/36 |
| 2 | 36 | 3 | 0.96/0.98 | 900/970 | 1.2/1.5 | 35/38 |
| 3 | 37 | 2 | 0.97/0.98 | 920/990 | 1.3/1.8 | 36/40 |
| 4 | 38 | 3 | 0.98/0.99 | 980/1020 | 1.8/2.2 | 40/42 |

*stress-strain properties of billets after hot deformation (depression) are given in numerator;
*stress-strain properties of billets after hot deformation and radial forging are given in denominator.

What is claimed is:

1. A method of manufacturing strained billets from metal chips, comprising the steps of:
   crushing said chips into particles;
   cleaning said particles;
   cold molding said particles into cylindrical briquettes;
   placing said briquettes into a capsule;
   sealing said capsule with upper and lower butt-end covers;

heating said capsule to a temperature in the range of 900–1080 deg C. and maintaining this temperature for a time sufficient for temperature equalization throughout the capsule volume;

loading said capsule into the mould section of a pressing rig, said pressing rig having an upper plunger with a principal press-washer and a lower plunger with an autonomous press washer each plunger extending into said mould section on opposite ends of said capsule;

hot deforming said capsule in the axial direction, wherein said hot deforming is carried out by application of dynamic impingement force by said press washers uniformly applied over the surfaces of said capsule butt-end covers, with sufficient repetitions and magnitude of force to result in a billet having the desired relative density;

and then cooling said formed billet.

2. The method in accordance with claim 1, wherein said particles have sizes in the range of 5–20 mm.

3. The method of claim 1 wherein said metal is a titanium alloy.

4. The method of claim 1 wherein said pressing rig is preheated to a temperature not less than 0.2 that of the capsule temperature prior to placement of said capsule in said pressing rig.

5. The method of claim 1 wherein:

at least one of said butt-end covers has a diameter (reduced diameter) less than the capsule diameter by two thicknesses of the capsule cowling;

wherein the diameter of said press-washer (reduced diameter) adjacent to said reduced diameter butt-end cover is also less than the capsule diameter by two thicknesses of the capsule cowling; and wherein said reduced diameter press-washer in cooperation with said mould section forms a chamber to receive capsule cowling shed during said hot deforming step.

6. The method of claim 5 wherein:

the sum of each said chamber volume and change in volume experienced by said capsule during hot deforming defines a work space; and wherein the height of said work space is defined by: $N \times (H_1 - H_2)$, where N is selected in the range of 1.2–1.5, and $H_1$ and $H_2$ are the capsule pre-and post-hot deformation axial dimensions.

7. The method of claim 1 wherein said cleaning step comprises the steps of: rinsing, drying and magnetic separating.

8. The method of claim 1 wherein:

cleaned particles are further subjected to vacuum thermal degassing comprising the steps of:

heating said particles to a temperature in the range of 550–650 deg C. under a vacuum pressure of $5 \times 10^{-3}$ mm Hg, maintaining said particles at said temperature and pressure for a time duration of about 1 to 2 hours, cooling said particles down to about 200 deg C. at said vacuum pressure, and cooling said particles to ambient pressure and temperature.

9. The method of claim 1, wherein said cold molding step results in briquettes having relative density of at least 0.6.

10. The method of claim 1, wherein said hot deforming step results in a deformation degree value of capsule deformation of at least 35%.

11. The method of claim 1, wherein said hot deforming step results in a billet relative density of at least 0.95.

12. The method of claim 1, wherein said hot deforming temperature is in the range of 900–1050 deg C.

* * * * *